United States Patent [19]

Saurenman

[11] Patent Number: 4,498,116
[45] Date of Patent: Feb. 5, 1985

[54] CONTROL OF STATIC NEUTRALIZATION EMPLOYING POSITIVE AND NEGATIVE ION DISTRIBUTOR

[76] Inventor: Donald G. Saurenman, 6787 Worsham Dr., Whittier, Calif. 90602

[21] Appl. No.: 570,926

[22] Filed: Jan. 16, 1984

Related U.S. Application Data

[63] Continuation-in-part of Ser. No. 420,904, Sep. 21, 1982, which is a continuation-in-part of Ser. No. 369,925, Apr. 19, 1982, which is a continuation-in-part of Ser. No. 290,423, Aug. 6, 1981, which is a continuation-in-part of Ser. No. 259,503, May 1, 1981, which is a continuation-in-part of Ser. No. 241,684, Mar. 9, 1981, which is a continuation-in-part of Ser. No. 124,242, Feb. 25, 1980.

[51] Int. Cl.³ ............................................. H05F 3/04
[52] U.S. Cl. .................... 361/213; 361/229; 361/231
[58] Field of Search ............... 361/212, 213, 215, 216, 361/220, 229, 231, 232

[56] References Cited

U.S. PATENT DOCUMENTS

| | | |
|---|---|---|
| 1,480,573 | 1/1924 | Smith . |
| 1,489,425 | 4/1924 | Chapman ........................ 361/213 |
| 2,043,217 | 6/1936 | Yaglou . |
| 2,231,324 | 2/1941 | Crompton, Jr. . |
| 2,264,495 | 12/1941 | Wilner . |
| 2,565,454 | 8/1951 | Mackenzie et al. . |
| 2,585,799 | 2/1952 | Lawrence . |
| 2,641,804 | 6/1953 | Klein . |
| 2,765,975 | 10/1956 | Lindenblad . |
| 2,844,478 | 7/1958 | Hanley et al. . |
| 3,106,884 | 10/1963 | Dalve et al. . |
| 3,203,809 | 8/1965 | Visness et al. . |
| 3,288,054 | 11/1966 | Weprin et al. . |
| 3,308,344 | 3/1967 | Smith et al. ..................... 361/229 |
| 3,311,108 | 3/1967 | Cristofv et al. . |
| 3,324,515 | 6/1967 | West . |
| 3,358,289 | 12/1967 | Lee . |
| 3,396,703 | 8/1968 | Trussell . |
| 3,483,672 | 12/1969 | Jahnke . |
| 3,696,791 | 10/1972 | Saurenman et al. . |
| 3,757,491 | 9/1973 | Gourdine . |
| 3,818,269 | 6/1974 | Stark . |
| 3,870,946 | 3/1975 | Sandorf . |
| 3,976,916 | 8/1976 | Saurenman . |
| 4,072,762 | 2/1978 | Rhodes . |
| 4,156,266 | 5/1979 | Testone ........................... 361/213 |
| 4,194,232 | 3/1980 | Cumming et al. ............... 361/213 |
| 4,208,438 | 6/1980 | Saurenman . |
| 4,213,167 | 7/1980 | Cumming et al. ............... 361/213 |
| 4,250,804 | 2/1981 | Saurenman . |
| 4,282,830 | 8/1981 | Saurenman . |
| 4,319,302 | 3/1982 | Moulden . |
| 4,326,454 | 4/1982 | Saurenman . |
| 4,333,123 | 6/1982 | Moulden . |

FOREIGN PATENT DOCUMENTS

| | | | |
|---|---|---|---|
| 538308 | 6/1955 | Belgium ........................... 361/213 |
| 478292 | 11/1951 | Canada ............................. 361/213 |
| 1028351 | 5/1966 | United Kingdom . |

Primary Examiner—Reinhard J. Eisenzopf
Attorney, Agent, or Firm—William W. Haefliger

[57] ABSTRACT

Apparatus to reduce static electricity in a work zone comprises:
(a) a first electrical conductor having first tips spaced therealong in a first row to dispense positive ions in response to first voltage application to the first conductor,
(b) a second electrical conductor having second tips spaced therealong in a second row to dispense negative ions in response to second voltage application to the second conductor, said first and second voltages being different, and
(c) a body mounting said conductors at locations and separations from one another characterized in that static electricity at or proximate the work to be treated is effectively reduced to non-objectionable levels when said differential voltages are applied to the conductors,
(d) the first and second rows being parallel.

8 Claims, 4 Drawing Figures

U.S. Patent    Feb. 5, 1985    4,498,116
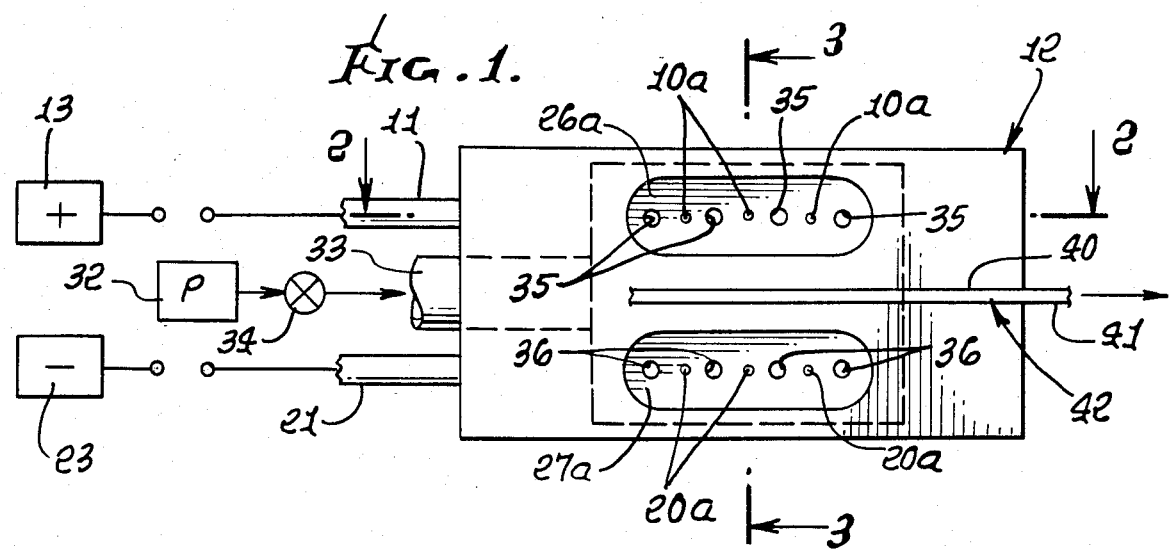
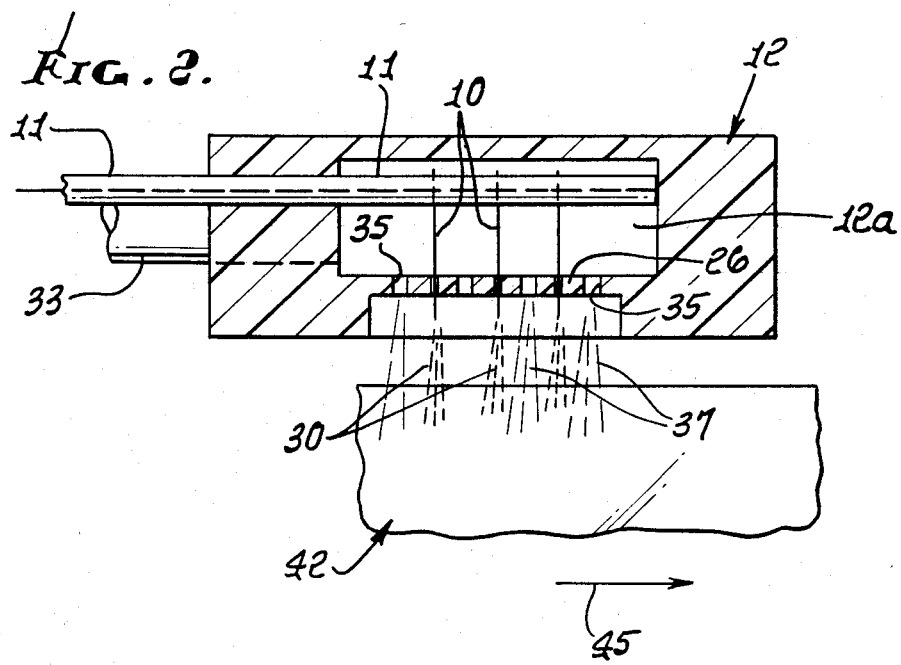
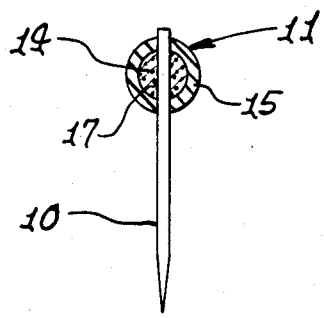
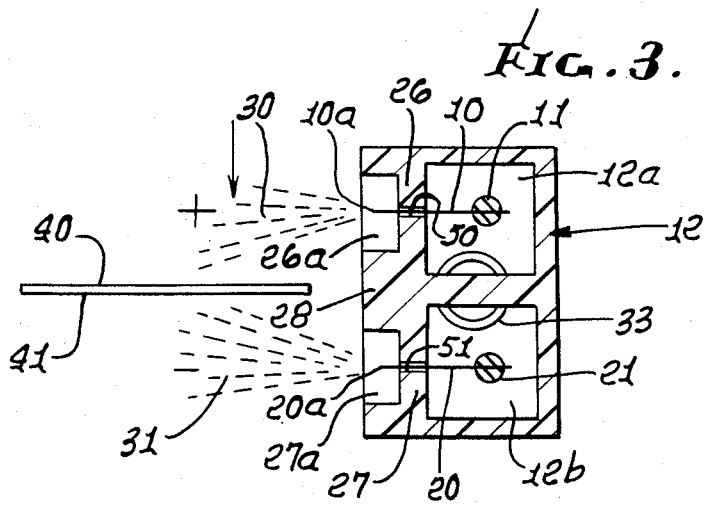

4,498,116

CONTROL OF STATIC NEUTRALIZATION EMPLOYING POSITIVE AND NEGATIVE ION DISTRIBUTOR

BACKGROUND OF THE INVENTION

This application is a continuation-in-part of Ser. No. 420,904, filed Sept. 21, 1982, which was a continuation-in-part of Ser. No. 369,925, filed Apr. 19, 1982, which is a continuation-in-part of Ser. No. 290,423, filed Aug. 6, 1981, which is a continuation-in-part of Ser. No. 259,503, filed May 1, 1981, which is a continuation-in-part of Ser. No. 241,684, filed Mar. 9, 1981, which is a continuation-in-part of Ser. No. 124,242, filed Feb. 25, 1980.

This invention relates generally to the provision of conductor means with ion dispensing tips or needles, located in zones for treatment of work such as plastic articles, film including photographic film, and electronics parts.

There is need for low cost, efficient means to induce collection of air-borne particles, and to suppress static build-up in certain article treating zones (electric parts production, film cleaning, paper rolling apparatus, surgical operating rooms, clean room assemblies, and circuit board fabrication, etc.). Prior ion dispensing devices were not easily installable to conform to special requirements as to product shape, zone size, etc., and often did not achieve desired static neutralization contrary to expectations.

SUMMARY OF THE INVENTION

It is a major object of the invention to provide apparatus and method to achieve controlled neutralization or reduction of static charge on or associated with work, or to achieve controlled net positive or negative ion flux in areas at or adjacent to work, including personnel.

The apparatus of the invention, for neutralizing work surfaces, so that dust and static will not collect thereon, includes:

(a) first electrical conductor means having first tips spaced therealong in a first row to dispense positive ions in response to first voltage application to the first conductor means, (b) second electrical conductor means having second tips spaced therealong in a second row to dispense negative ions in response to second voltage application to the second conductor means, said first and second voltages being different, and (c) a body mounting said conductor means at locations and separations from one another characterized in that static electricity at or proximate the work to be treated is effectively reduced to non-objectionable levels when said differential voltages are applied to the conductor means, (d) the first and second rows being parallel.

As will appear, the rows of tips, which may be formed by needles, are located in first and second recesses defined by the body, these recesses typically extending in closely separated parallel relation, with a barrier therebetween, whereby work surfaces close to the recesses may be exposed to both positive and negative ions, simultaneously, for neutralization of work surfaces. Further, a cavity in the body may communicate with openings about the needles so that pressurized gas supplied to the cavity passes in jet streams via the openings to discharge from the recesses in the direction of ion dispersing. Two planes of jetted gas are typically provided, in "knife-like" patterns. The combination of gas jets as described and static neutralization serves to completely clean dust particles off the work surfaces.

These and other objects and advantages of the invention, as well as the details of an illustrative embodiment, will be more fully understood from the following description and drawings, in which:

DRAWING DESCRIPTION

FIG. 1 is a frontal elevation showing apparatus incorporating the invention;

FIG. 2 is a section on lines 2—2 of FIG. 1;

FIG. 3 is a section on lines 3—3 of FIG. 1; and

FIG. 4 is a cross section taken through a needle and conductor cable.

DETAILED DESCRIPTION

In FIGS. 1-3, first electrical conductor means is provided to have first tips spaced therealong, and in a first row, to dispense positive ions in response to first voltage application to the first conductor means. In these views, the first tips $10a$ are typically formed by electrically conductive needles 10 extending parallel to one another in a first row. High voltage is supplied to the needles 10 from a conductor such as a cable 11 projecting from the needle support body 12 and extending to a positive voltage source 13. FIG. 4 shows the cable 11 as having an electrically conductive core 14, and insulative sheath 15 thereon. The needles are pressed into the cable to fully and sidewardly contact the core, as at 17. The needles typically project through the cable, as shown.

Second electrical conductor means is also provided to have second tips spaced therealong, and in a second row to dispense negative ions in response to second voltage application to the second conductor means. As illustrated for example, the second tips $20a$ are typically formed by electrically conductive needles 20 extending parallel to one another in a second row. The row of needles 10 is generally parallel to row 20 for best results. High voltage is supplied to the needles 20 from a second conductor such as cable 21 projecting from body 12 and extending to a negative voltage source 23. Cable 21 has a construction like cable 11, and the needles 20 project through cable 21 in the same manner that needles 10 project through cable 11.

The voltage sources 13 and 23 may supply voltages such that positive voltage between 3,000 and 7,000 volts DC is supplied at tips $10a$, and an approximately equal but negative voltage between $-3,000$ and $-7,000$ volts DC is supplied at tips $20a$. A usable voltage source is disclosed in U.S. Pat. No. 3,308,344.

The body 12 typically consists of molded plastic, electrically insulative, material, and forms at least one and typically two chambers $12a$ and $12b$ therein. As shown in FIG. 3, the two chambers respectively receive the two cables 11 and 21 from which the needles project forwardly through openings in body walls 26 and 27. The latter are at the bottom of corresponding recesses $26a$ and $27a$ formed in one side of the body, tips $10a$ and $20a$ projecting in or exposed in the recesses, near walls 26 and 27; thus they are protected from inadvertent finger contact. Recesses $26a$ and $27a$ extend in parallel rows corresponding to the two rows of tips, with a separating divider 28 therebetween.

Also provided is means to supply gas streams associated with the needle rows, and directed in the direction of ion dispersement by the needles (see dispersement positive ion paths at 30 and dispersement negative ion paths at 31, in FIGS. 2 and 3). The gas supply means may include a pressurized gas (as for example air) source 32, and duct 33 extending from that source to the body 11 to supply gas under pressure to the cavities 12*a* and 12*b*. A valve 34 in series with duct 33 is operable to control the gas flow pressure and rate. Gas issues from the cavities via openings in walls 26 and 27, parallel to the needles. See for example openings 35 in a first row, and openings 36 in a second row, these openings being spaced from the needles, but located in the needle defined rows. Gas jets from openings 35 appear at 37. Alternatively, or in addition, the openings through which the needles project may be sufficiently large to pass gas jets. The gas or air jets sweep across work surfaces, as at 40 and 41, removing dust particle neutralized by the ions contacting the work surfaces and particles. Despite positive ions directed at one surface, such as plastic film (photographic film 42 for example) and negative ions directed at the opposite surface, it is found that the surfaces are electrically neutralized, with consequent static removal. Therefore, dust particles no longer statically cling to the surfaces and can be swept away by the jet streams. Thus, a highly effective "air-knife" effect is created. The film can also be passed in the direction indicated by arrow 45 in FIG. 2, past the two rows of tips, with static neutralizing effect. Work surfaces other than film are also statically neutralizable and freed of particulate by the apparatus described.

Needle openings in walls 26 and 27 appear at 50 and 51.

I claim:

1. In apparatus for reducing static electricity in a work zone, the combination that includes:

(a) first electrical conductor means having first tips spaced therealong in a first row to dispense positive ions in response to first voltage application to the first conductor means, (b) second electrical conductor means having second tips spaced therealong in a second row to dispense negative ions in response to second voltage application to the second conductor means, said first and second voltages being different, and (c) a body mounting said conductor means at locations and separations from one another characterized in that static electricity at or proximate the work to be treated is effectively reduced to non-objectionable levels when said differential voltages are applied to the conductor means, (d) the first and second rows being parallel, (e) the first conductor means including a first conductor having positive voltage applied thereto, and the second conductor means includes a second conductor having negative voltage applied thereto, the conductors located within said body, and including differential voltage sources connected with said conductors, (f) said body comprising a molded plastic block having a wall defining two rows of openings therein, the conductor means defining two rows of needles on which the tips are formed, the needles penetrating through said openings, (g) each conductor comprising a flexible cable having a conductive core and a sheath thereon, the needles sidewardly contacting the core, the flexible cables extending in parallel relation outside the body, (h) the cables in the body extending openly in separate chambers to which pressurized gas is supplied for delivery through said openings, and the needles having ends supported entirely by the flexible cables in said chambers, (i) there being additional small openings in said wall and between the needle opening locations, for discharging gas between the needles of each row, said additional openings being slightly larger than said needle openings.

2. The combination of claim 1 wherein said tips are in first and second recesses defined by the body.

3. The combination of claim 1 including means on said body to supply gas streams associated with said rows of tips and directed in the direction of ion dispersement from said tips.

4. The combination of claim 1 wherein the body forms two elongated recesses which are parallel and which respectively receive said two rows of tips.

5. The combination of claim 4 wherein said body includes first and second sections, the first section having said elongated recesses sunk therein, the tips exposed to the exterior and located near the bottoms of the recesses.

6. The combination of claim 5 wherein the body second section has at least one cavity formed therein and exposed to the rear sides of openings parallel to the needles forming said tips, and gas supply means connected to said cavity, the needles also projecting in the cavity, the openings sufficiently large to discharge gas streams from the cavity and from said recesses.

7. The combination of claim 6 wherein the needles are supported to extend in the cavity, said sections being electrically insulative.

8. The combination of one of claims 1–6 including work passing in front of and exposed to said tips.

* * * * *